Oct. 18, 1932.  E. CHRISTIANSEN  1,883,565
VARIABLE SPEED FRICTION GEAR
Filed Nov. 13, 1930
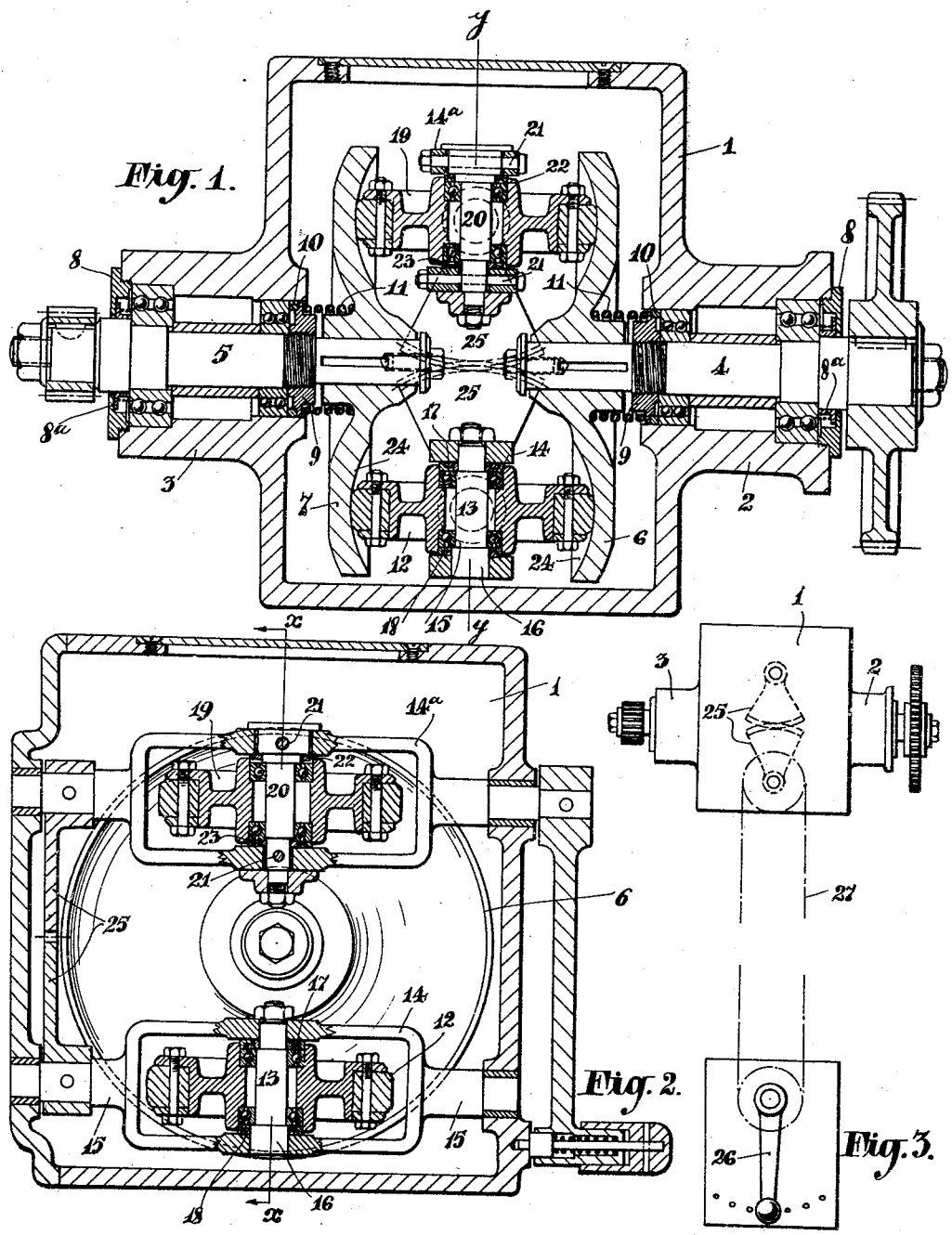

Patented Oct. 18, 1932

1,883,565

UNITED STATES PATENT OFFICE

EJNAR CHRISTIANSEN, OF BIRMINGHAM, ENGLAND

VARIABLE SPEED FRICTION GEAR

Application filed November 13, 1930, Serial No. 495,528, and in Great Britain July 17, 1930.

This invention relates to variable speed friction gear of the type comprising two face discs and intermediate discs transmitting the drive from one face disc to the other, the intermediate discs being each mounted on a bracket having trunnion pins mounted in a frame so that the discs can oscillate about an axis at right angles to the axis of the face discs.

When a plurality of intermediate discs are used unless the axis of the discs are correctly positioned in relation to one another there is liability of one intermediate disc contacting with one face disc only and another intermediate disc contacting with the other face disc only and thereby preventing the drive being transferred from one face disc to the other. Further the transference of the drive from one face disc to the other face disc will be interfered with if other inaccuracies are present in other parts of the structure.

According to the present improvements, means are provided so that an intermediate disc (or discs) automatically accommodates itself in relation to another or to one another, so that all the intermediate discs are always in contact with both face discs. For this purpose one or more of the intermediate discs are mounted so that they are capable of a floating action. Both the face discs are spring pressed against the intermediate discs, and the intermediate discs are mounted in brackets arranged to swivel in a stationary frame. Preferably two intermediate discs are used and one disc is fixed against movement axially in relation to the face discs. The other intermediate disc is mounted to have a small floating movement so that the axis of rotation can automatically adjust itself to lie mid-way between the face discs. Preferably the spindle on which the intermediate disc is mounted has a slight floating movement in the swivel bracket.

In the preferred form the spindle on which the floating intermediate disc is mounted is guided to have a movement in a direction parallel to the axis of the face discs. This latter spindle is mounted on ball bearings and the means for guiding the spindle preferably also anchor the spindle against rotation.

By this invention also the friction discs are mounted in a box which is sealed against the ingress of oil, whilst the ball bearings are also sealed against the leakage of oil into the chamber enclosing the friction discs.

Referring to the drawing:—

Figure 1 is a sectional elevation on line $x$—$x$ of Figure 2.

Figure 2 is a section on line $y$—$y$ of Figure 1, and

Figure 3 is an elevation of a control.

According to one form of the invention the friction discs are mounted in a cast metal box or frame 1 having bosses 2 and 3 projecting from the exterior opposite faces. Each boss carries two sets of ball bearings which carry spindles 4 and 5 which pass to the interior of the gear box, one face friction disc 6 being slidably keyed on the end of one spindle 4, whilst the second face friction disc 7 is slidably keyed on the end of the other spindle 5. The outer end of each said boss is sealed by means of a screwed cap 8 engaging a screwed thread in the bore of the boss, a sliding ring 8a being pressed against the inner face of the screwed cap by means of a spiral spring. The inner side of each boss is sealed by means of a screwed cap 9 engaging a screw threaded portion of the spindle, the cap having a sealing ring 10 at the rim for bearing against the outer race of one ball bearing. A helical spring 11 bears against these inner caps and the face discs to normally press the face discs inwardly towards one another. An intermediate disc 12 is mounted on a spindle 13 carried by a swivel bracket 14. This swivel bracket comprises a rectangular frame having trunnions 15 passing from opposite sides, which trunnions are rotatably mounted in the opposite walls of the casing 1 aforementioned. The spindle for the intermediate disc has an enlarged cylindrical head 16 which has a good fit in a hole in the swivel bracket, such head being adapted to butt against the inner race of a ball bearing. The other end of the spindle is of reduced diameter and passes through a hole in the opposite wall of the swivel bracket and is fixed in position by means of a nut. A sealing member 17 is mounted on the reduced portion of the spindle 13 and forms an oil-tight seal around the outer side of a second ball bearing. A sealing washer 18 is similarly placed between the outer side of the other ball bearing and the wall of the swivel bracket. The intermediate disc 12 comprises a wheel having a rim which is flanged on one side. A ring of suitable friction material is placed on this ring and is fixed in position by means of bolts which pass through a clamping ring and through the friction ring and the flange formed on the rim. The second intermediate disc 19 is mounted between the face discs on the opposite side of the axis of these discs. The spindle carrying this intermediate disc, however, is mounted to have a small amount of lateral play in the swivel bracket. For this purpose the holes in each wall for receiving the spindle 20 are of a diameter larger than the spindle, and bolts 21 are passed through each wall of a swivel bracket 14a and diametrically through the spindle, thereby constraining the spindle to be capable only of a lateral movement between the face discs by sliding on the said bolt. These bolts also prevent the spindle from rotating. If the spindle were not so anchored there would be liability of the spindle rotating with the ball bearings, particularly as the sealing members 22 and 23 on each side, when the gear is new press against the race rings of the ball bearing.

The face discs have grooves 24 therein so that the intermediate discs can be rotated to frictionally engage therewith at varying distances from the axis of rotation, and the two swivel brackets are rotated in unison by means of tooth quadrants 25 mounted on the swivel bracket trunnions inside the gear case. One of the swivel bracket trunnions is continued through the wall of the casing and is provided with a hand lever. This lever is fitted with a spring pressed plunger for engaging a perforated plate for locking the gear in the adjusted position. The perforations are also arranged at positions corresponding to predetermined gearing rates.

The gear wheels may be operated in any suitable manner, for instance as shown in Figure 3, the control lever 26 may be at a distance from the gear box and connected by a band or chain band 27.

I claim:

1. A variable speed friction gear comprising two face friction discs, a plurality of intermediate discs for transmitting the drive from one face disc to the other and each mounted on a spindle, a bracket associated with each spindle in which both ends of the respective spindle are mounted having trunnion pins rotatably mounted in a stationary frame so that the position of each of said intermediate discs can be rotatably adjusted about an axis at right angles to the axis of the face discs, and means for mounting both ends of a spindle on which an intermediate disc is rotatably mounted so that such spindle is capable of a sliding movement in its said bracket in a direction at right angles to the axis of such spindle and in the direction of the line passing between the points of contact of the intermediate disc with the face discs in order that the spindle will be automatically adjusted centrally between the two face discs.

2. A variable speed friction gear comprising two face friction discs, a plurality of intermediate discs for transmitting the drive from one face disc to the other and each mounted on a spindle, brackets in which both ends of said spindles are respectively mounted having trunnion pins rotatably mounted in a stationary frame so that the position of each of said discs can be rotatably adjusted about an axis at right angles to the axis of the face discs, two pins carried by one of the said brackets which pass diametrically through the ends of the spindle of an intermediate disc so that such spindle is slidably mounted in a direction at right angles to the axis of such spindle and in the direction of the line passing between the points of contact of the intermediate disc with the face discs, in order that the spindle will be automatically adjusted centrally between the two face discs.

In witness whereof I have signed this specification. Birmingham, England.

EJNAR CHRISTIANSEN.